United States Patent [19]
Amberg et al.

[11] Patent Number: 5,664,221
[45] Date of Patent: Sep. 2, 1997

[54] SYSTEM FOR RECONFIGURING ADDRESSES OF SCSI DEVICES VIA A DEVICE ADDRESS BUS INDEPENDENT OF THE SCSI BUS

[75] Inventors: Mark F. Amberg, Littleton; William K. Miller; Frank M. Nemeth, both of Colorado Springs; Dwayne H. Swanson, Westminster, all of Colo.

[73] Assignee: Digital Equipment Corporation, Maynard, Mass.

[21] Appl. No.: 557,473

[22] Filed: Nov. 14, 1995

[51] Int. Cl.$^6$ .............................. G06F 13/10; G06F 9/00
[52] U.S. Cl. ........................ 395/829; 340/825.52
[58] Field of Search .............................. 395/829, 823, 395/287, 306, 200.2, 800, 281; 364/708.1; 340/825.52

[56] References Cited

U.S. PATENT DOCUMENTS

| | | | |
|---|---|---|---|
| 4,443,866 | 4/1984 | Burgiss, Sr. ........................... | 395/280 |
| 4,608,562 | 8/1986 | Minor et al. ........................ | 340/825.59 |
| 4,675,813 | 6/1987 | Locke ................................... | 395/829 |
| 4,730,251 | 3/1988 | Aakre et al. ........................... | 395/284 |
| 4,773,005 | 9/1988 | Sullivan ................................ | 395/829 |
| 4,920,339 | 4/1990 | Friend et al. ........................ | 340/825.52 |
| 5,175,822 | 12/1992 | Dixon et al. ........................... | 395/829 |
| 5,239,632 | 8/1993 | Larner .................................... | 395/306 |
| 5,276,813 | 1/1994 | Elliott et al. .......................... | 395/829 |
| 5,301,276 | 4/1994 | Kimura ................................... | 395/829 |
| 5,428,748 | 6/1995 | Davidson et al. ..................... | 395/829 |
| 5,524,269 | 6/1996 | Hamilton et al. ....................... | 395/829 |
| 5,551,053 | 8/1996 | Nadolski et al. ....................... | 395/829 |

Primary Examiner—Gopal C. Ray
Attorney, Agent, or Firm—Ronald C. Hudgens; Cathy L. Peterson

[57] ABSTRACT

A system for assigning addresses to devices interconnected on a small computer system interface (SCSI) bus. A device address bus independent of the SCSI bus interconnects address assignable devices on the SCSI bus. The devices, each of which has a SCSI ID by which it is identified and being set with default bus address information representing the SCSI ID, are connected to one or more address lines on the device address bus. A system user can selectively reconfigure the bus addresses of the devices by utilizing a personality unit to override one or more bits of the bus address information. The personality unit includes a bus address selector, coupled to the device address bus, which selects address lines according to user input. The selecting of an address line effects a change in the default bus address information associated with the one or more devices connected to the selected address line.

3 Claims, 8 Drawing Sheets

SYSTEM FOR RECONFIGURING ADDRESSES OF SCSI DEVICES VIA A DEVICE ADDRESS BUS INDEPENDENT OF THE SCSI BUS

FIELD OF THE INVENTION

The present invention relates generally to device address assignment techniques. Specifically, the invention is directed to devices in the Small Computer System Interface (SCSI) environment.

BACKGROUND OF THE INVENTION

In a Small Computer System Interface (SCSI) bus-based system, each SCSI peripheral device is addressable for communication purposes by way of an assigned SCSI bus address or ID. Typically in the prior art, this bus address is hardwired in the device or device back plane connector. While this address designation may be altered, as is desirable during system configuration, such alteration is inconvenient since it requires manual intervention with the system.

One known and widely-used technique for assigning physical addresses to devices on the SCSI bus involves the removal or installation of jumper or plug connections on the device connector of the SCSI bus back plane. Device installation is thus difficult because the user must access and modify individual device connections at the back plane through a panel at the rear of the system enclosure. Another prior art technique, such as the switchable bus termination and address selector described in U.S. Pat. No. 4,920,339, assigns the address for each device by setting a switch (e.g., dual inline packaged "DIP" or rotary type) mounted on the exterior of the device housing to the desired address. This approach eliminates the user's need for directly accessing the back plane, but has certain drawbacks associated with it. It shares in common with the first approach the disadvantage of requiring that each individual SCSI bus address be set manually. Moreover, each SCSI compatible device must be designed to include a selector apparatus. Lastly, such an approach does not allow a user to take full advantage of the wide (16-bit) SCSI bus ANSI standard by utilizing existing 8-slot (device) SCSI enclosures or shelves in support of up to 16 devices.

U.S. Pat. No. 5,175,822 describes a master interface reconfiguration routine executed by a master device on the SCSI bus to dynamically assign addresses to peripheral devices in an existing bus structure. Address configuration information is transmitted by the master device over the SCSI bus to a peripheral device, which then propagates subsequent configuration information to an adjacent device. Such an invention is useful in adapting program-controlled address assignment techniques to the SCSI environment, which includes devices with unalterable (i.e., hardwired) addresses. During configuration, the master device maps the addresses of those devices which cannot be reassigned. This solution does not, however, extend the device addressing range of the existing structure.

Therefore, there exists a clearly felt need in the art to provide a system user with the capability of reconfiguring physical device addresses to alter a system configuration and to extend the bus address range as needed without accessing individual devices or back plane connections. Further, it is desirable to enable the user to service up to fifteen devices (host excluded) using only one 8 device slot shelf design.

SUMMARY OF THE INVENTION

Accordingly, it is an object of the present invention to provide remote control of device IDs independent of SCSI bus routing.

It is a further object of the present invention to provide user accessible SCSI I/O cabling.

It is yet another object of the present invention to provide support for up to fifteen SCSI I/O devices on a single wide SCSI bus using one 8-device shelf enclosure design.

In a broad sense, the above and other objectives are attained by a system for assigning SCSI device addresses, the system including a number of devices interconnected on a SCSI bus. Each device has a SCSI ID by which it is identified and is set with default bus address information, the bus address information comprising a 4-digit binary pattern which represents the SCSI ID. The system further includes a device address bus independent of the SCSI bus, the devices being connected to one or more address lines on the device address bus. Also included is a personality unit for reconfiguring the bus addresses of the devices. The personality unit includes a bus address selector coupled to the device address bus and responsive to user input, the bus address selector effecting a change in the default bus address information associated with one or more of the devices by selecting one or more address lines in response to user input.

In a narrower sense, the bus address selector comprises a set of switches, each of the switches being connected to an address line of the device address bus and grounding the address line connected thereto when the switch is closed. The closed switch thus effects a change in the default bus address information associated with the device connected to the grounded address line.

In another aspect of the present invention, the personality unit and up to seven I/O devices are supported in a single 8-slot shelf enclosure. The shelf enclosure includes two SCSI buses which are connected within the shelf to form one continuous SCSI bus. The personality unit acts as an extension of a 16-bit SCSI bus back plane. It has an upper SCSI bus connector for receiving a SCSI I/O bus cable from a source external to the shelf and a lower SCSI bus connector for connecting the shelf to another shelf via a daisy chain cable, such that one shelf is connected to another on the same SCSI bus.

The ID control scheme of the present invention offers several advantages. It allows a wide range of control over the IDs of SCSI devices on a back plane without having to manually set the ID of each device. Once this scheme is designed into the back plane, the personality unit can modify the device IDs to suit a particular system configuration. By utilizing the ID control scheme and personality unit of the present invention, multiple shelves can be daisy chained together on the same SCSI bus to support up to fifteen devices at one time.

BRIEF DESCRIPTION OF THE DRAWINGS

The above objects, features and advantages of the present invention will become more apparent from the following detailed description taken in conjunction with the accompanying drawings, in which.

DESCRIPTION OF THE PREFERRED EMBODIMENT

Figure 1:
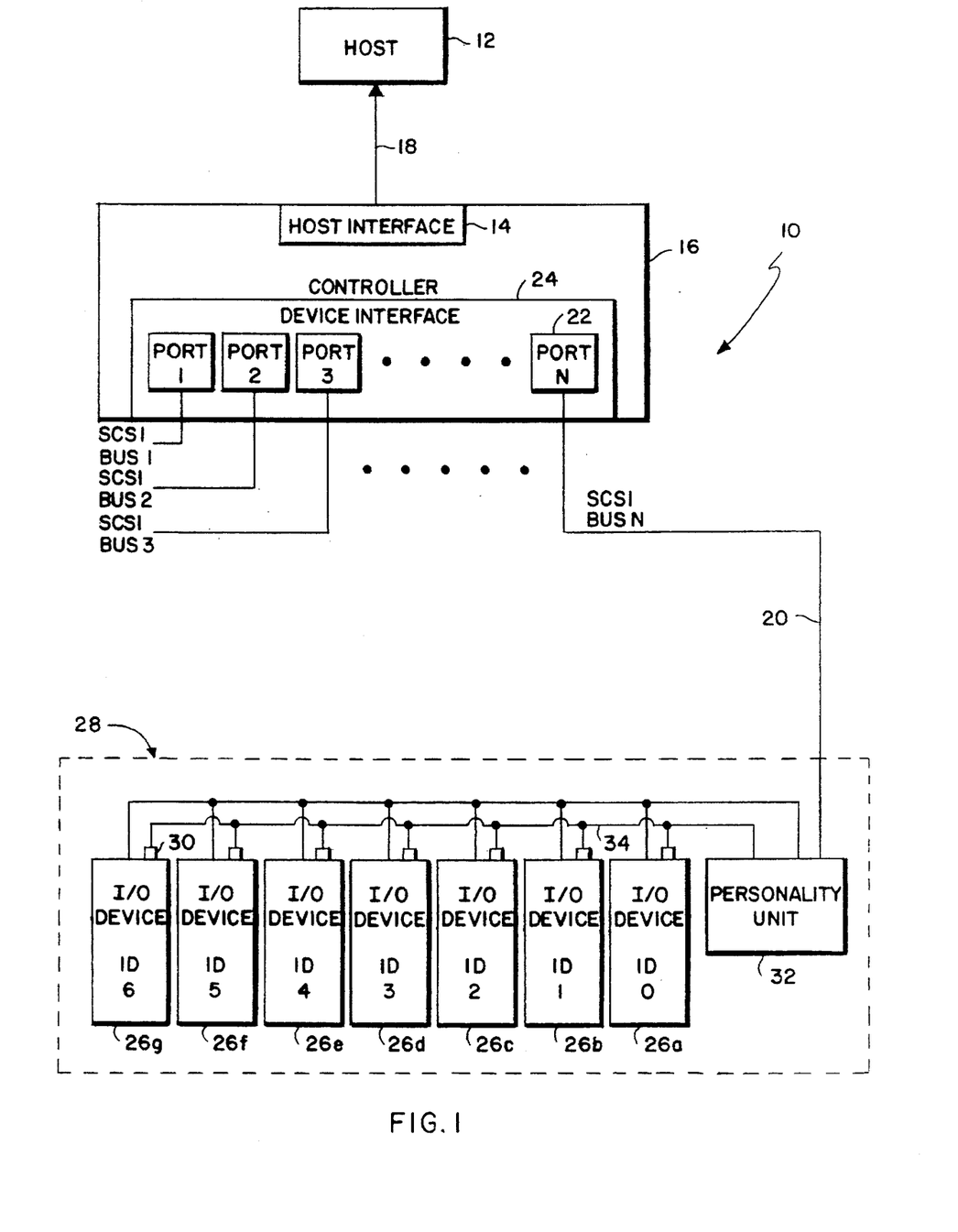
FIG. 1 is a block diagram of a computer system having a host-coupled storage controller interconnected by SCSI bus to a storage array subsystem, which includes I/O devices, a personality unit, and an independent device address bus, in accordance with the principles of the present invention.

Referring to FIG. 1, there is illustrated a computer system 10 having a host 12 coupled to a host interface 14 of a storage controller 16 via a host interconnect bus 18. The host 12 communicates through the storage controller 16 to one or more of a plurality of conventional SCSI buses 20. Each SCSI bus 20 is connected to one of a plurality of device ports 22 at a device interface 24 in the controller 16. The SCSI bus permits data transfer to/from any connected I/O device. According to the SCSI-1 standard, a SCSI-1 compliant bus allows a maximum total of eight devices to be interconnected on the SCSI bus at any one time. The SCSI-2 and -3 standard specifications provide for a 2 byte "wide" bus, which can support up to sixteen devices and device addresses. In the preferred embodiment shown in FIG. 1, the SCSI bus 20 is a wide SCSI bus.

An overview of the SCSI bus may be had with reference to a book by NCR Corporation entitled "SCSI: Understanding The Small Computer System Interface" (Prentice-Hall, 1990). More detailed information on the characteristics and operation of the SCSI bus may be had with reference to ANSI documents X3.131-1986 and X3.131-1992 (Global Engineering Documents, Irvine, Calif.).

Returning again to FIG. 1, a plurality of I/O devices 26a, 26b, 26c, 26d, 26e, 26f, 26g in a storage array subsystem 28 are interconnected on the SCSI bus 20. Each is identified by a bus address 30. Although not shown, the host as a SCSI initiator also has a bus address. Each device's bus address 30 is physically implemented in the device by switches on the device or by suitable jumper connections programming default bus address information in the form of a 4-digit binary address for the device. As shown, I/O devices 26a, 26b, 26c, 26d, 26e, 26f, 26g have been programmed with default bus address information corresponding to SCSI IDs 0, 1, 2, 3, 4, 5 and 6, respectively. The I/O devices 26 in the preferred embodiment shown in FIG. 1 are disk drives, but could also be tape drives, CDROM drives, tape magazine subsystems, or some combination thereof; however, the principles of the present invention may be extended to systems utilizing other SCSI compatible peripherals and I/O devices.

In accordance with the present invention, the SCSI bus external to the storage array subsystem 28 is received by a personality unit 32 in the subsystem. The personality unit routes the SCSI bus lines to a back plane (not shown) and the devices are interconnected on the SCSI bus at the back plane in known fashion. The personality unit is further coupled to each of the I/O devices by way of an independent device address bus 34. The personality unit 32 and the address bus 34 will discussed in further detail later.

Theoretically, the 16-bit wide SCSI bus can support up to 16 SCSI device addresses. Existing shelf enclosures, designed to house I/O devices mounted in storage or data center cabinets such as the StorageWorks (TM) SW500-Series or SW800-Series cabinets available from Digital Equipment Corporation, typically support up to 7 devices and their corresponding bus addresses. An example of a specific application of the present invention is presented with respect to such a shelf enclosure in FIG. 2. Also illustrated in schematic representation are particular aspects of the SCSI bus pertinent to the present invention.

Figure 2:
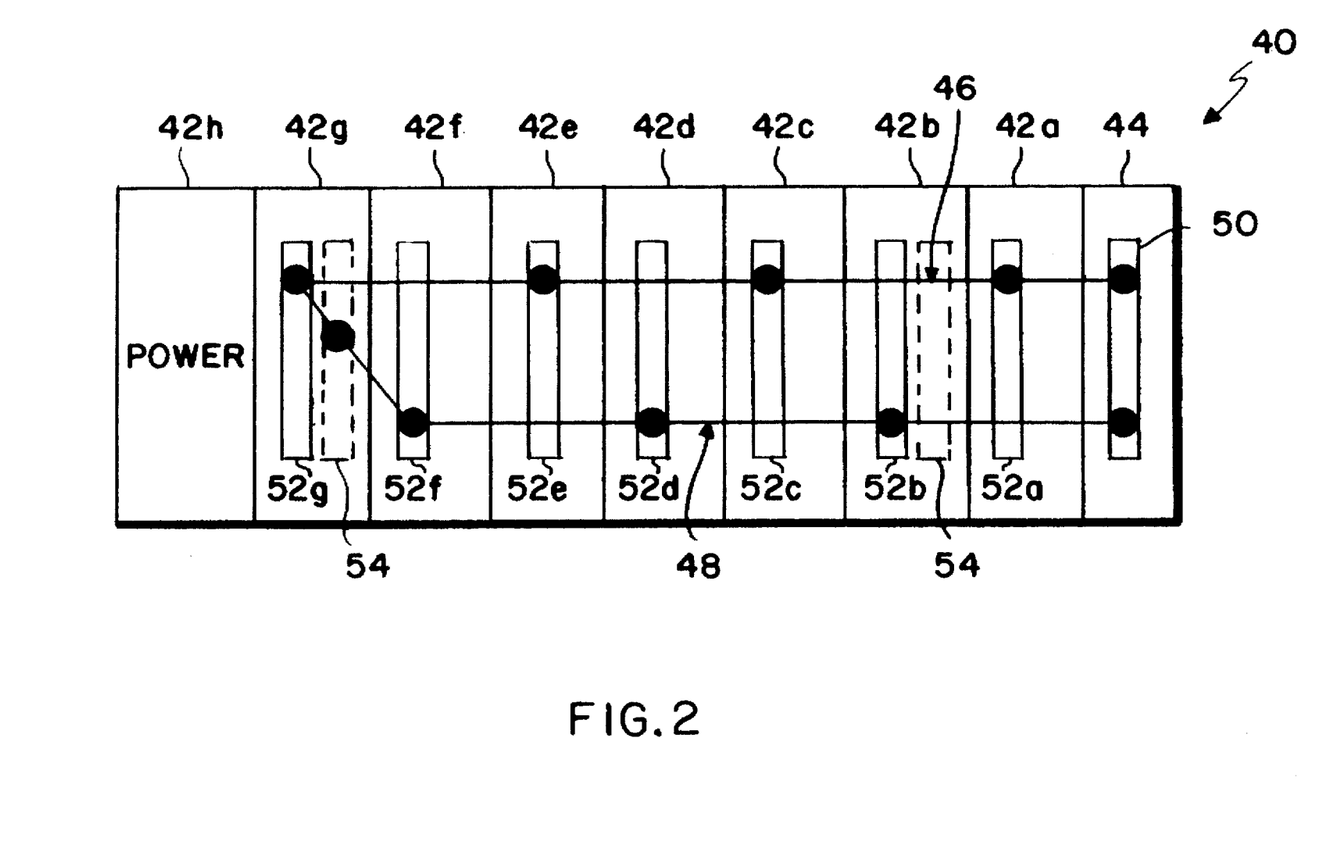
FIG. 2 is a schematic illustration of an 8-slot storage cabinet shelf enclosure, the shelf enclosure being depicted in a single-bus, externally terminated configuration.
Figure 3:
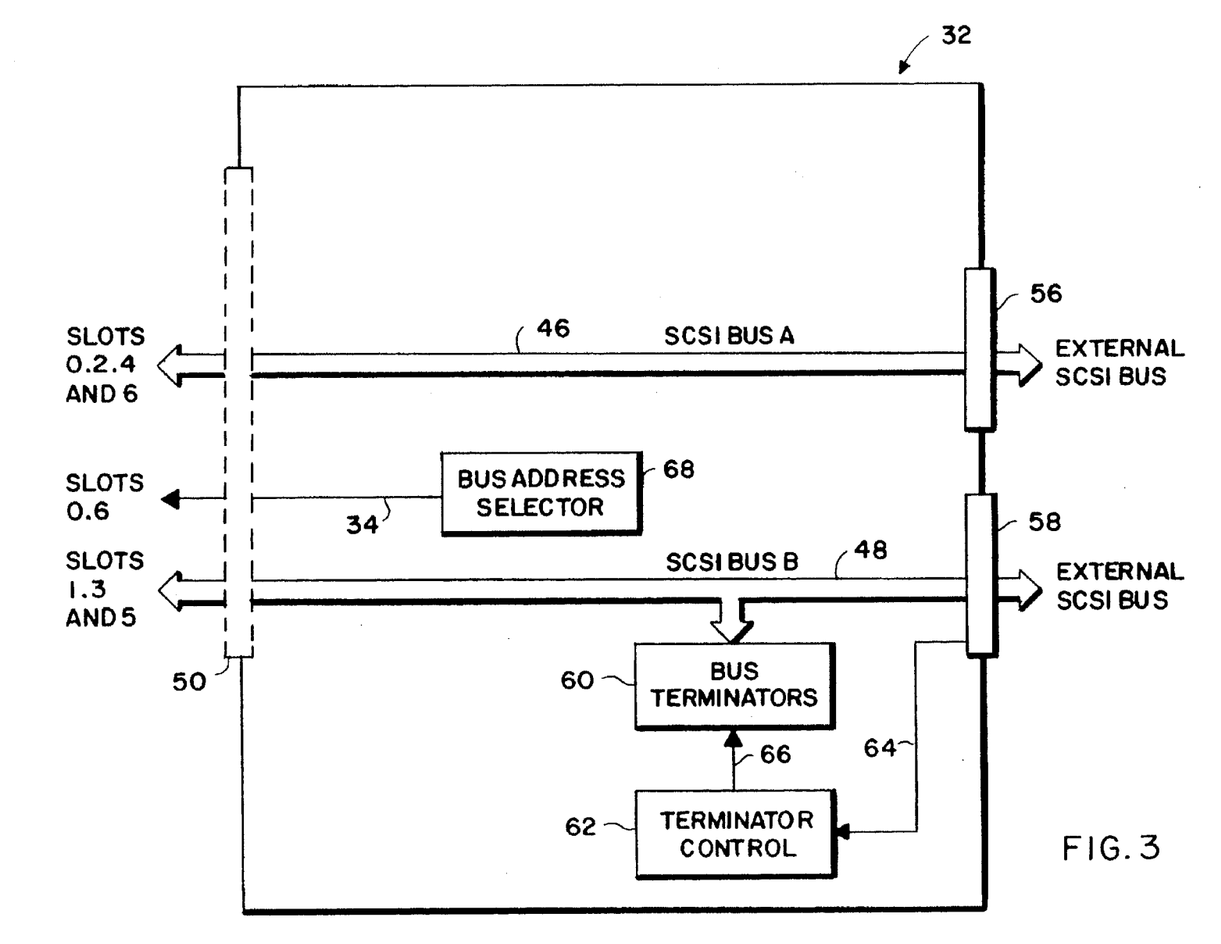
FIG. 3 is a functional block diagram of the personality unit shown in FIG. 1.

Referring to FIG. 2, a datacenter cabinet shelf enclosure 40 has eight device slots 42a, 42b, 42c, 42d, 42e, 42f, 42g, 42h, corresponding to slots 0 through 7, respectively. Slots 0 through 6 house SCSI I/O devices 26a–g (from FIG. 1). Typically, and as indicated in the figure, slot 7 is occupied by a power source (labeled "PS"), which supplies power to the shelf. Adjacent to slot 0 is the personality unit slot 44. As illustrated, the shelf enclosure 40 contains internally two independent SCSI buses, bus "A" 46 and bus "B" 48. Bus A 46 serves device slots 0, 2, 4 and 6, and bus B 48 serves device slots 1, 3 and 5. Personality unit back plane connector 50 routes the SCSI bus to and from the I/O devices. The manner in which the SCSI bus actually enters and exits the shelf enclosure will be more fully explained when FIG. 3 is discussed in detail. Still referring to FIG. 2, I/O device back plane connectors 52a, 52b, 52c, 52d, 52e, 52f, 52g corresponding to slots 0 through 6, respectively, receive the SCSI buses as shown and thus provide the interconnection between I/O device and SCSI bus. One or more of the device slots have a spare connector 54. In the example illustrated in the figure, slots 1 and 6 are provided with the spare connector 54 (shown in dashed lines) for receiving external termination or jumpered cards. Thus, the SCSI buses can be internally jumped to form one continuous bus that can be terminated internally within the personality unit or externally using a terminator card. In the configuration illustrated in FIG. 2, the spare connector at the slot 6 location contains a jumper board, thus joining bus A and bus B as one continuous bus. The bus automatically terminates in the personality unit 32, as will be discussed with reference to FIG. 3. Alternatively, the buses can be used as two, separate buses (dual bus configuration), each terminated internal to the shelf with a termination card. When the shelf is configured to contain two independent buses, duplicate device bus addresses can exist in the shelf, as long as they don't exist on the same bus. Further, duplicate device slot addresses can exist if only one of the slots to which the duplicate addresses are assigned is used.

Figure 6:
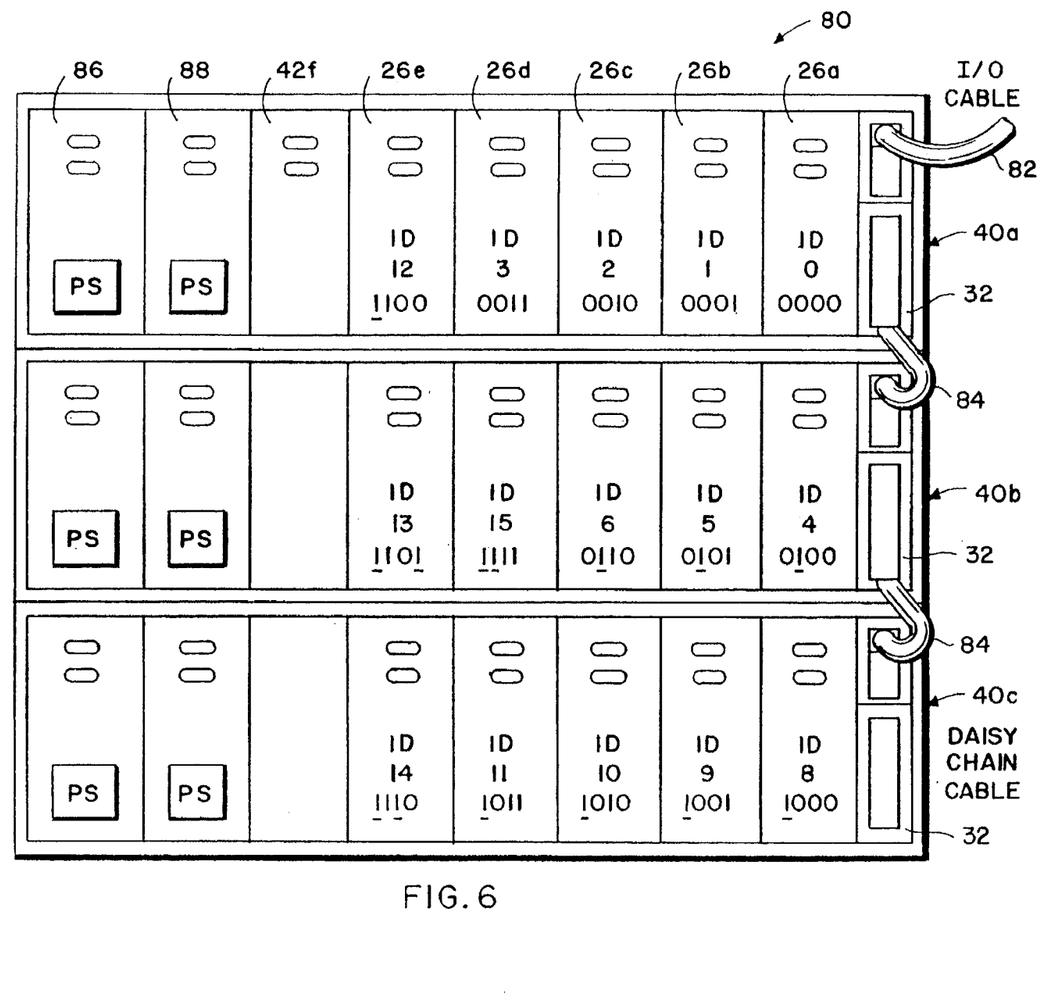
FIG. 6 is a front view of the shelf enclosure shown in FIG. 2 in a triple-shelf configuration for serving up to 15 device addresses, with device address 7 being reserved for the host.
Figure 7:
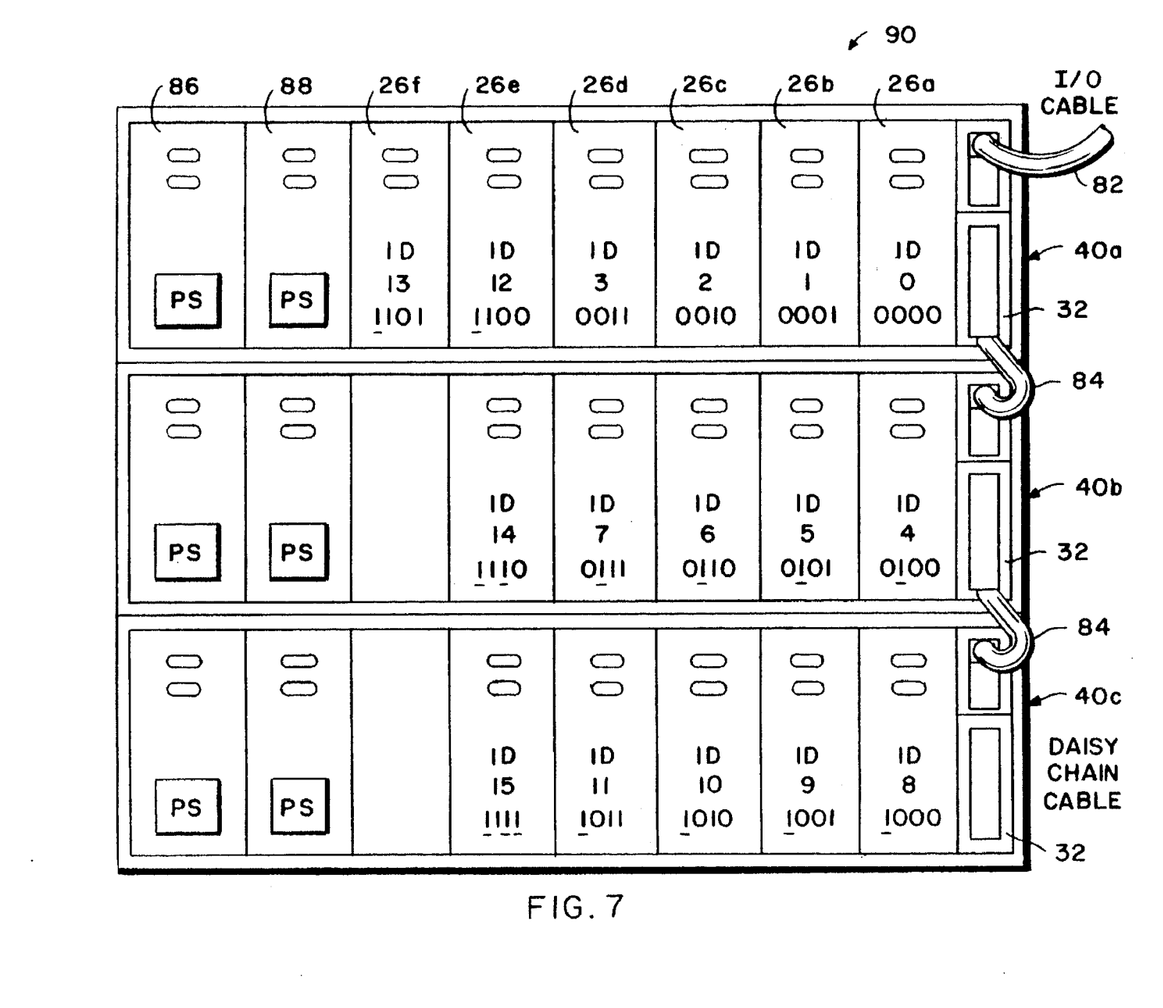
FIG. 7 is front view of an alternative triple-shelf configuration for serving up to 15 device addresses, any of which can be used for the host.

Although not shown in FIG. 2, multiple shelves may be daisy chained together. Instead of terminating at the personality unit, a daisy chain cable couples one shelf to another, which then terminates in its respective personality unit or is daisy chained to yet another shelf. A triple shelf configuration will be discussed further when FIGS. 6 and 7 are described in detail.

Figure 4:
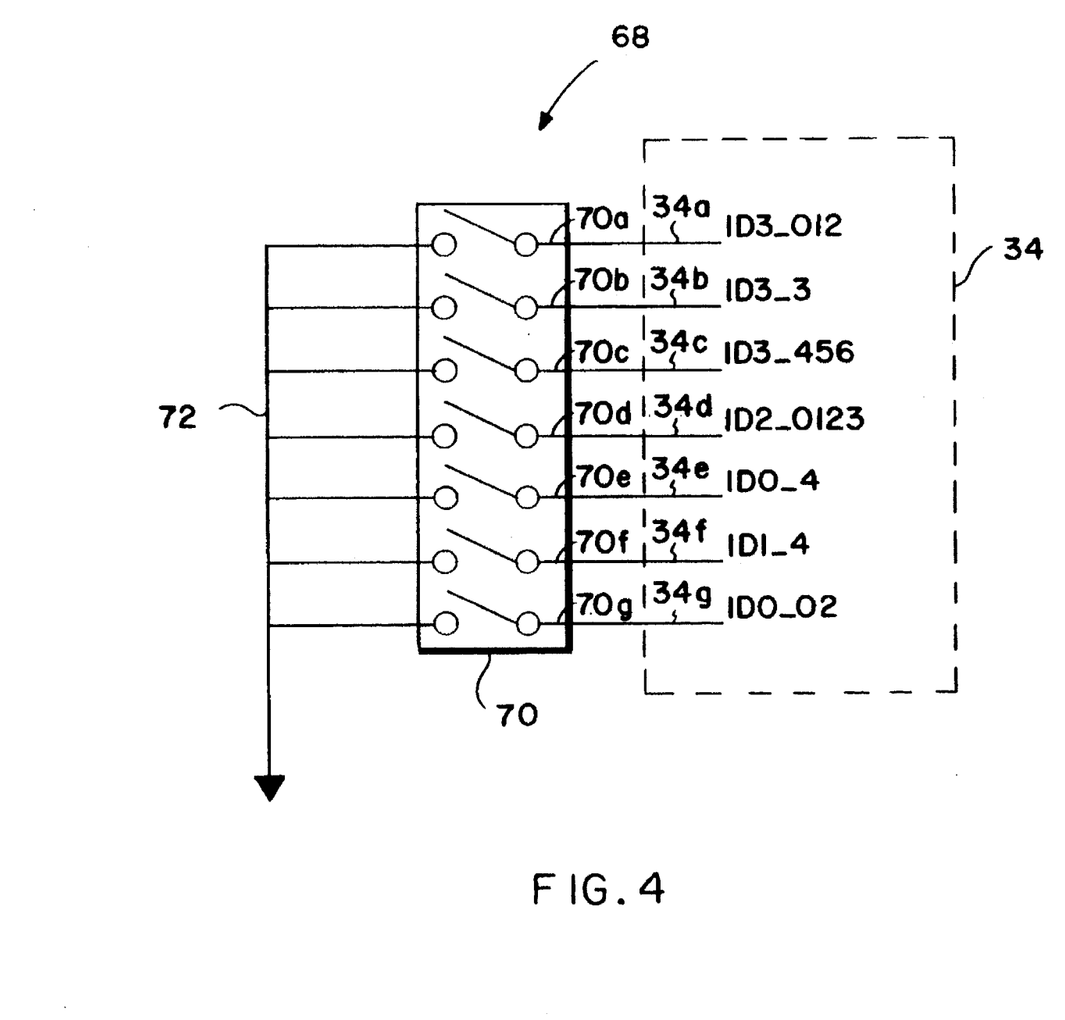
FIG. 4 is a schematic diagram of the bus address selector utilized by the personality unit shown in FIG. 3.

The functionality of the personality unit 32 of FIG. 1 is depicted in greater detail in FIGS. 3 and 4. In the preferred embodiment, the personality unit 32 configures the width of the SCSI buses 46, 48 as 16-bit wide buses. Referring now to FIG. 3, an upper SCSI bus connector 56 and a lower SCSI bus connector 58 are the shelf's connections to the external SCSI bus. Bus A 46 uses the upper SCSI bus connector 56 as its input/output connector and Bus B 48 uses the lower SCSI bus connector 58 as its I/O connector. Bus terminators 60 are connected to SCSI bus B and provide active bus termination when not disabled by a terminator control 62.

The terminator control 62 provides the shelf with an automatic bus termination feature. The terminator control 62 monitors the lower SCSI bus connector 58 via a monitor signal 64 and disables the bus terminators via a disable signal 66 when a cable is attached to the lower SCSI bus connector 58. When the SCSI buses are configured as one bus as shown in FIG. 2, all SCSI bus addresses or IDs are available at the upper SCSI bus connector 56.

The personality unit back plane connector 50 (shown in FIG. 3 in dashed lines) routes all SCSI bus and control signals from the device back plane connectors to the circuitry of the personality unit 32. Similarly, it routes all outgoing signals to the device back plane connectors. Such outgoing signals include address signals. Address signals of the device address bus 34 (also shown in FIG. 1) to be delivered to the device back plane connectors are selected by a bus address selector 68. In broad terms, the bus address selector drives the address lines or signals of the device address bus 34 in response to a user input, i.e., a system user's system configuration (I/O device SCSI ID assignments) selection. This aspect of the invention will be discussed further in reference to FIGS. 4–7.

FIG. 4 provides a more detailed view of the bus address selector 68. In the embodiment shown in FIG. 4, the bus address selector 68 includes a set of switches 70, each switch 70a–g being connected to a different one of address lines 34a–g of the address bus 34. Specifically, switch 70a is connected to address line 34a ("ID3_012"), switch 70b is connected to address line 34b ("ID3_3") and switch 70c is tied to address line 34c ("ID3_456"). Additionally, switches 70d, 70e, 70f, and 70g are tied to the address lines 34d, 34e, 34f and 34g, respectively. Each switch is also connected to a ground 72. Thus, the closing of a switch serves to ground or select the address signal connected to that switch. It can be understood that "user input" in the embodiment shown is the setting of the switches by a system user who wishes to modify the system configuration. Although the bus address selector 68 is depicted as including a set of switches, the present invention need not be so limited. With particular reference to the function of the bus address selector, the principles of the invention may be extended to any mechanism for driving the address lines according to a user or user-specified input. For example, the bus address selector could be implemented as a logic circuit which, in response to a user input, determines the selection of address lines.

Figure 5:
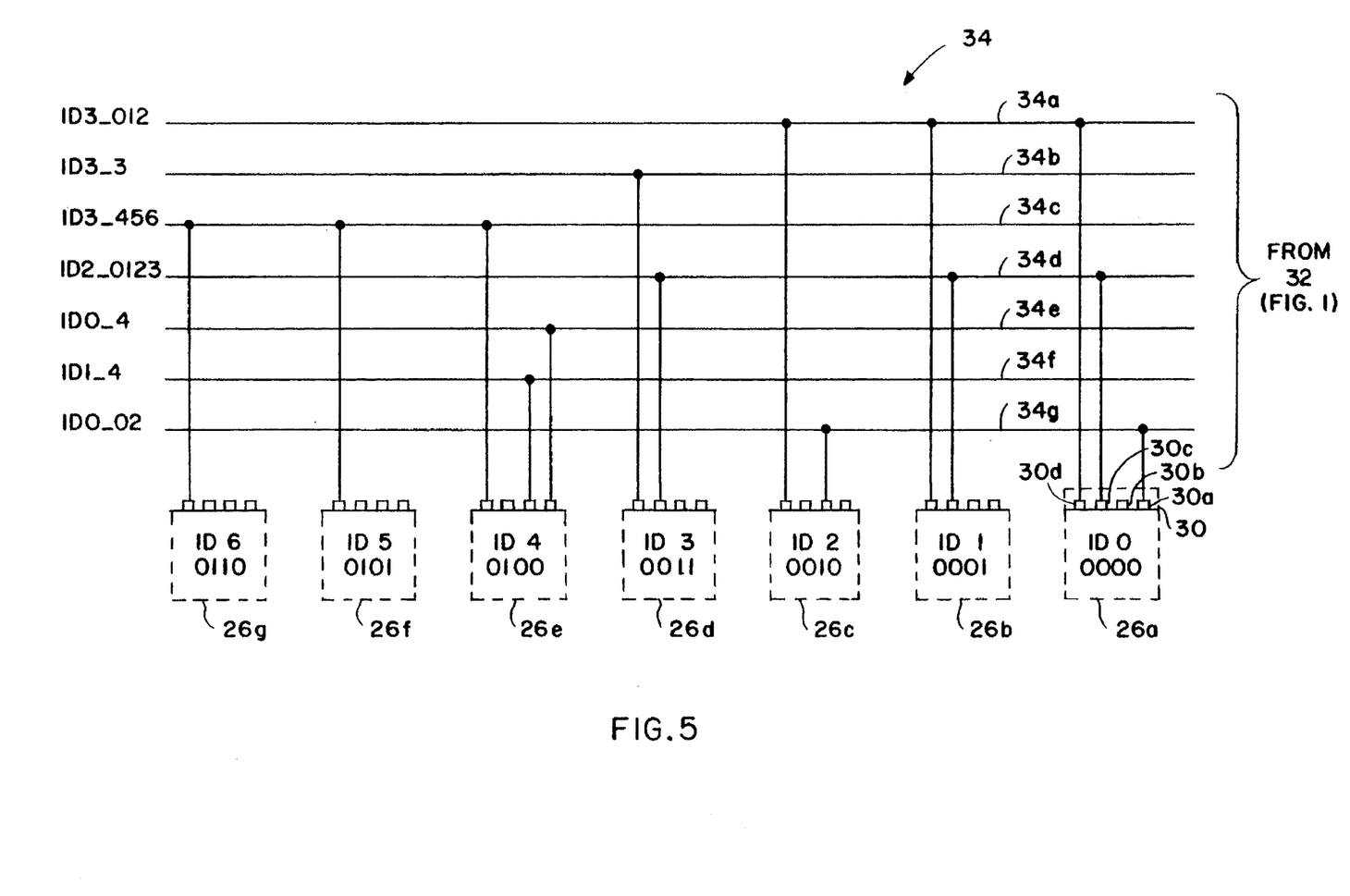
FIG. 5 is a detailed illustration of the independent device address bus shown in FIGS. 1 and 4 according to a preferred embodiment of the present invention.

Another aspect of address bus 34 is illustrated in FIG. 5. As was indicated with respect to FIG. 4, the address bus is comprised of seven address bus lines 34a–g. These seven lines are provided by the personality unit 32 (FIG. 1), each of the lines being distributed to one or more of the I/O devices 26a–26g (ID0 through ID6) as shown. The I/O devices are shown in dashed lines so as to exclude them from the structure of the address bus 34, while presenting the nature of their interconnection to the address bus 34. Each one of the distributed address signals 34a–g is tied to a particular bus address bit 30a (bit 0), 30b (bit 1), 30c (bit 2), or 30d (bit 3) in the 4-bit binary representation of the physical bus address 30 (also shown in dashed lines) of the one or more I/O devices according to the preferred embodiment. In a default setting (i.e., bus address switches 70 of FIG. 4 open), the bus address bits connected to the address bus 34 are held internally at logic 0. Other bus address bits not connected to the address bus (such as bit 30b in I/O device 26a, as an example) are tied high or (as in the example) low in the device itself or at the device back plane connector, since they never change. When a switch is closed, the address line to which it is connected is held low or "selected", and the corresponding bus address bit is "1" when the I/O device reads it. After the device has thus interpreted the address signal (or signals), it responds to and uses the "selected" bus address as its bus address. Thus, the selection of an address signal by the bus address selector (illustrated in FIG. 4) serves to override a bit in the default bus address information of the one or more I/O devices connected to the selected address signal.

As previously mentioned, up to three shelve enclosures can be connected in daisy chain fashion to form one SCSI bus serving up to sixteen addresses, any one of which can be used for the host. Thus, in the populated, triple-shelf configuration 80 shown in FIG. 6, an external SCSI bus I/O cable 82 is attached to the personality unit 32 of a first shelf enclosure 40a, which is connected by a daisy chain cable 84 to the personality unit 32 of a second shelf enclosure 40b. The second shelf enclosure 40b is connected in the same manner to yet another (third) shelf enclosure 40c. Therefore, the triple-shelf configuration enables a system user to install and assign the appropriate SCSI bus addresses to as many as fifteen I/O devices by reconfiguring the bus addresses as discussed with reference to FIGS. 4 and 5. Moreover, the user can employ a first power supply 86 in slot 7 and a second (optional) power supply 88 in slot 6 of any one of the shelves 40 in a dual supply configuration if power supply redundancy is desired. In the triple shelf arrangement shown in FIG. 6, bus address (SCSI ID) 7 is reserved for the host (or host adapter). For the purpose of highlighting the specifics of the bus address reconfigurations with respect to the triple shelf configuration in FIG. 6, the binary representations of the SCSI IDs of the I/O devices are shown in the figure. The underlined bits correspond to the bits which were changed as a result Of the reconfiguration.

Bus address reconfiguration information associated the triple-shelf configuration 80 in FIG. 6 can be described in terms of the switch settings of each of the personality units 32 and the resultant device bus addresses for the devices installed in each shelf enclosure, as shown in Table I:

TABLE I

| Shelf | Switch Pattern Switch 1→7 | Device Bus Addresses Slot 6→Slot 0 |
| --- | --- | --- |
| S1 | 0010000 | —, —, 12, 3, 2, 1, 0 |
| S2 | 0111100 | —, —, 13, 15, 6, 5, 4 |
| S3 | 1110010 | —, —, 14, 11, 10, 9, 8 |

In each of the switch settings shown in Table I, a "0" corresponds to an "OFF" or open switch position. A "1" signifies an "ON" or closed switch position. The double dashed lines denote an unused shelf slot. With reference to the switch pattern for the shelf enclosure 40a ("S1"), by way of example, the setting of switch 3 to a closed position serves to ground address line 34c, thereby changing the most significant bus address bit in I/O device 26e from logic 0 to logic 1. Therefore, this setting changes default SCSI ID 4 (0100) to 12 (1100). The IDs for slots 0 through 3 are unaffected and thus remain the same (default ID). Slot 5 or 42f is not used by any device. Slot 6 is not used by any device, but may be used by the second power supply 88 (as shown) if power redundancy is desired. With reference to the switch pattern for the shelf enclosure 40c ("S3"), as a second example, the setting of switches 1, 2, 3 and 6 (shown as switches 70a, 70b, 70c and 70f, respectively, in FIG. 4) to a closed ("ON") position serves to ground address lines 34a, 34b, 34c and 34f, thereby changing bus address bit 3 (shown as 30d in FIG. 5) in I/O devices 26a–e and bit 1 (shown as 30b) in I/O device 26e from logic 0 to logic 1. Therefore, this setting changes default SCSI IDs 0–4 to 8, 9, 10, 11 and 14, respectively.

An alternative, triple-shelf configuration 90 is shown in FIG. 7. In this configuration, the host (or host adapter) must occupy a device slot in one of the three shelf enclosures. In contrast to the triple shelf configuration 80 shown in FIG. 6, slot 42f (slot 5) in shelf enclosure 40a is used. Also, since no address is reserved, I/O device 26f in shelf enclosure 40a is now used for SCSI ID 13, I/O devices 26d and 26e in shelf enclosure 40b are now configured for SCSI IDs 7 and 14, respectively, and I/O device 26e in shelf enclosure 40c is now configured for SCSI ID 15. As in the triple-shelf configuration 80, the triple-shelf configuration 90 can employ dual power supplies (power supplies 86 and 88) in each of the shelf enclosures 40a–c.

The bus address reconfiguration information for the triple shelf configuration 90 in FIG. 7 can be described in terms of the switch settings of each of the personality units 32 and the resultant device bus addresses for the devices installed in each shelf enclosure, as shown in Table II:

TABLE II

| Shelf | Switch Pattern Switch 1→7 | Device Bus Addresses Slot 6→Slot 0 |
|---|---|---|
| S1 | 0010000 | —, 13, 12, 3, 2, 1, 0 |
| S2 | 0011010 | —, —, 14, 7, 6, 5, 4 |
| S3 | 1110110 | —, —, 15, 11, 10, 9, 8 |

For shelf enclosure 40a ("S1"), by way of example, the setting of switch 3 to a closed position serves to ground address line 34c, thereby changing the most significant bus address bits in I/O devices 26e and 26f from logic 0 to logic 1. Therefore, this setting changes default SCSI ID 4 (0100) to 12 (1100) and default SCSI ID 5 (0101) to 13 (1101). The IDs for slots 0 through 3 are unaffected and thus remain the same (default ID). Slot 6 is not used by any device, but may be occupied by the second power supply 88. With reference to the switch pattern for the shelf enclosure 40c ("S3"), the setting of switches 1, 2, 3, 5 and 6 (shown as switches 70a, 70b, 70c, 70e and 70f, respectively, in FIG. 4) to a closed ("ON") position serves to ground address lines 34a, 34b, 34c, 34e and 34f, thus changing bus address bit 3 (shown as 30d in FIG. 5) in I/O devices 26a–e and bits 0 and 1 (shown as 30a and 30b, respectively) in I/O device 26e from logic 0 to logic 1. Therefore, this setting changes the default SCSI IDs 0–4 to 8, 9, 10, 11 and 15, respectively.

Although not shown, it can be appreciated that the present invention may be applied to the implementation of an 8-bit version of the personality unit. In an 8-bit implementation, a shelf enclosure may be configured with a single bus (default addresses 0 to 6 corresponding to slots 0 to 6, respectively) or dual bus configuration. By installing a special address jumper in an 8-bit personality module, the jumper controlling a signal distributed to all of the slots, a dual bus configuration can be utilized for RAID to give SCSI IDs 1, 1, 3, 3, 5, 5, and 6, corresponding to slots 0 to 6, respectively. Clearly, this type of redundancy configuration is achievable with the 16-bit personality unit as well.

Figure 8:
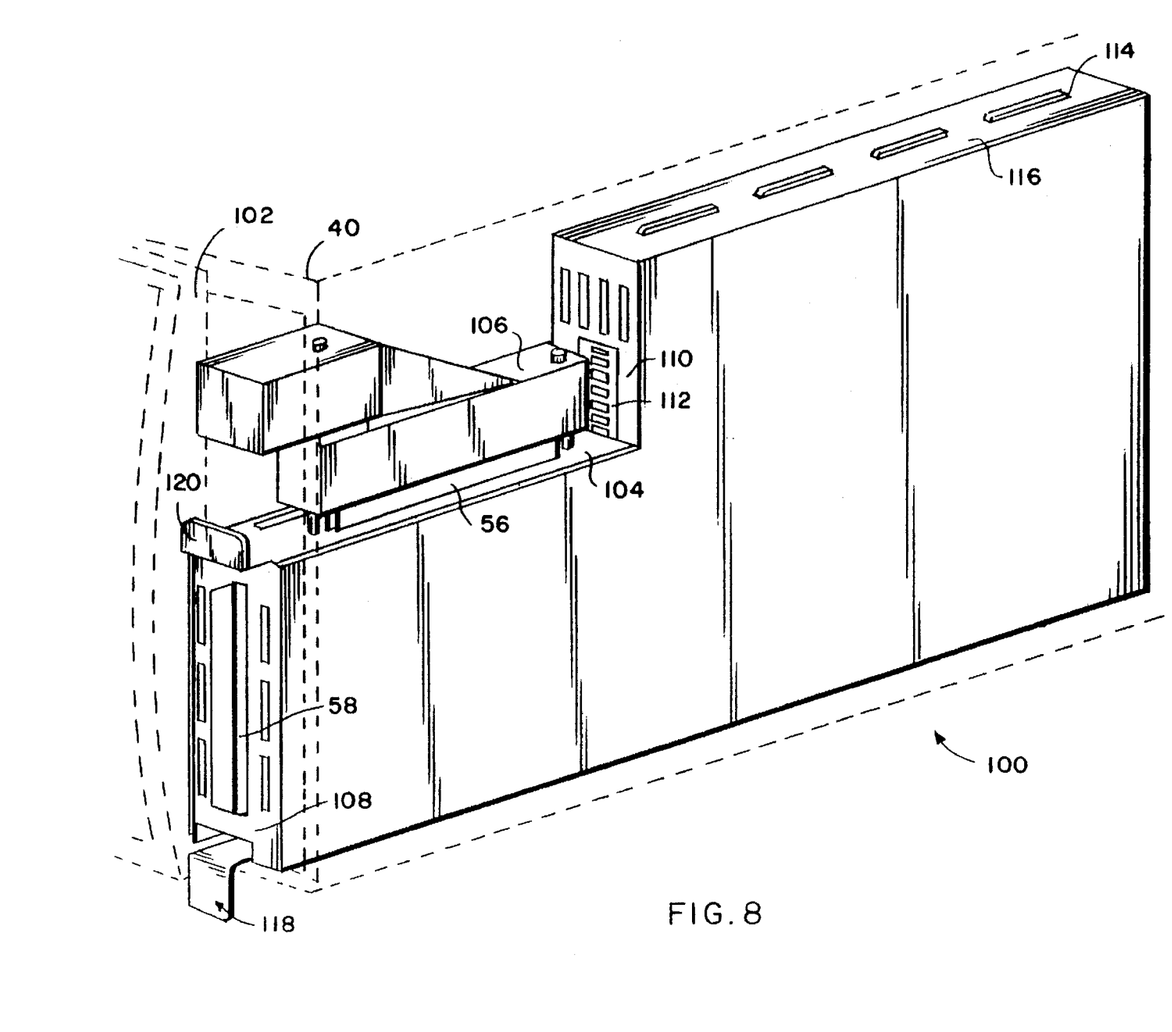
FIG. 8 is a perspective view of the personality unit enclosure, showing the external (user) access to SCSI bus cable connections and mechanical DIP switch device used to implement the switches shown in FIGS. 3 and 4.

To highlight the ease with which a user can remotely reconfigure device bus addresses to suit the requirements of a particular system configuration and access the SCSI cable attachments, a perspective view of a personality unit enclosure 100 for housing the personality unit 32 is presented in FIG. 8. The illustrated view of FIG. 8 depicts the enclosure 100 in its installed position within the shelf enclosure 40. In the preferred embodiment, the personality unit enclosure 100 is situated in a shelf location adjacent to device slot 0. In the figure, the shelf enclosure 40 and an I/O device carrier 102 for housing I/O device 26a are shown in dashed lines, thus distinguishing them from the personality unit enclosure. As shown, the personality unit enclosure has located in a top panel 104 the upper SCSI bus connector 56 for receiving the SCSI I/O cable 82 (shown in FIGS. 6–7) from an external unit, such as the controller 16 shown in FIG. 1 Due to the horizontal positioning of the upper SCSI bus connector in the embodiment illustrated in FIG. 8, the upper SCSI bus connector is shown mated with a right angle connector extension 106. The lower SCSI bus connector 58, used to connect a daisy chain cable when a multiple shelf configuration is required, is located on a lower front panel 108 and is approximately flush with the front of the shelf 40 as shown. Behind the upper SCSI bus connector 56 on an upper front panel 110, recessed from the lower front panel 108 by the length of the top panel 104, is a switch device 112, depicted as a seven position mechanical DIP switch, corresponding to the bus address selector switches 70 of FIG. 4. Guides 114 are embossed into an upper surface 116 and base surface (not shown) of the enclosure, the upper and base surfaces coming into contact with the shelf enclosure when the personality unit enclosure is in an installed position therein. As the unit is installed, these guides fit into channels molded into the shelf. The channels prevent misalignment as they guide the module into position against its back plane connector 50 (shown in FIG. 3). A lower mounting tab 118 and an upper mounting tab 120 are provided on the base surface (not shown) and the top panel 104, respectively, and are positioned with respect to the lower front panel 112 to aid the user during installation and subsequent removal of the personality unit. The lower mounting tab 118 is also dimensioned and positioned with respect to the front of the shelf enclosure to function as a latch, preventing the unit from sliding out of the shelf enclosure due to shock or vibration.

Although the above description has proceeded with reference to a specific embodiment of the invention, the invention is not necessarily limited to the particular embodiment shown herein. It is to be understood that various other adaptations and modifications may be made within the spirit and scope of the invention as set forth by the claims.

What is claimed:

1. A system for reconfiguring device addresses comprising:

a small computer interface (SCSI) bus;

devices interconnected on the SCSI bus, the devices each having a SCSI bus address by which the device is identified and set with default bus address information representing the SCSI bus address;

a device address bus independent of the SCSI bus, the device address bus including address lines, each of the address lines being coupled to the default bus address information in at least one of the devices; and a bus address selector coupled to the device address bus and responsive to user input, the bus address selector selecting at least one address line in response to user input to change the default bus address information associated with each device connected to the selected address line.

2. A system for reconfiguring device addresses according to claim 1, wherein the bus address selector comprises:

a set of switches, each switch in the set of switches being connected to an address line and selecting the address line connected thereto when the switch is closed by a user to change the default bus address information associated with the device connected to the selected address line.

3. A system for reconfiguring device addresses comprising:

a small computer interface (SCSI) bus;

devices interconnected on the SCSI bus, the devices each having a SCSI bus address by which the device is identified and programmed with bus address bits forming a binary representation of the SCSI bus address;

a device address bus independent of the SCSI bus, the device address bus including address lines, each address line being tied to one of the bus address bits in at least one of the devices; and a bus address selector coupled to the device address bus, the bus address selector including switches each being connected to an address line and selecting the address line connected thereto when the switch is closed by a user to change the SCSI bus address associated with the device connected to the selected address line.

* * * * *